(12) United States Patent
Hara

(10) Patent No.: US 8,130,729 B2
(45) Date of Patent: Mar. 6, 2012

(54) RADIO BASE STATION SYSTEM, CONTROL APPARATUS, AND RADIO APPARATUS

(75) Inventor: Masanori Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 527 days.

(21) Appl. No.: 12/345,178

(22) Filed: Dec. 29, 2008

(65) Prior Publication Data

US 2009/0291681 A1 Nov. 26, 2009

(30) Foreign Application Priority Data

May 20, 2008 (JP) ................................ 2008-131890

(51) Int. Cl.
*H04B 7/216* (2006.01)
(52) U.S. Cl. ........ 370/335; 370/336; 370/395; 370/466; 455/422.1; 455/561
(58) Field of Classification Search ............... 455/422.1, 455/561; 370/466, 350, 254, 335, 395
See application file for complete search history.

(56) References Cited

U.S. PATENT DOCUMENTS

| 2005/0105534 A1 | 5/2005 | Osterling |
| 2005/0105552 A1* | 5/2005 | Osterling .................... 370/466 |
| 2006/0265519 A1 | 11/2006 | Millet |
| 2007/0177552 A1 | 8/2007 | Wu et al. |
| 2007/0230368 A1 | 10/2007 | Shi et al. |
| 2008/0089689 A1 | 4/2008 | Sakama |
| 2009/0245228 A1* | 10/2009 | Osterling .................... 370/350 |
| 2011/0032910 A1* | 2/2011 | Aarflot et al. ................ 370/335 |

FOREIGN PATENT DOCUMENTS

| CN | 1770713 | 5/2006 |
| EP | 1 802 048 | 6/2007 |
| JP | 2007-511955 | 5/2007 |
| JP | 2007-529926 | 10/2007 |
| JP | 2007-306362 | 11/2007 |
| JP | 2008-099137 | 4/2008 |

OTHER PUBLICATIONS

CPRI Specification V2.0 (Oct. 1, 2004).*
CPRI Specification V3.0 (Oct. 20, 2006) Common Public Radio Interface (CPRI); Interface Specification, Oct. 20, 2006.
Extended European Search Report with written opinion for corresponding European Patent Application No. 08172806.5 dated Oct. 23, 2009.

* cited by examiner

*Primary Examiner* — David Q Nguyen
(74) *Attorney, Agent, or Firm* — Myers Wolin, LLC

(57) ABSTRACT

In a radio base station system in which a plurality of radio apparatuses are cascade-connected to a control apparatus, the control apparatus transmits information which is updated each time passing through the radio apparatuses, to a communication link that passes through each of the radio apparatuses and is then received by the control apparatus, and identifies the radio apparatuses in the cascade connection, based on an update status of the information having passed through each of the radio apparatuses.

20 Claims, 16 Drawing Sheets

RADIO BASE STATION SYSTEM, CONTROL APPARATUS, AND RADIO APPARATUS

CROSS-REFERENCE TO RELATED APPLICATION(S)

This application is based upon and claims the benefit of priority of the prior Japanese Application No. 2008-131890, filed on May 20, 2008 in Japan, the entire contents of which are hereby incorporated by reference.

FIELD

The embodiment(s) discussed herein relates to a radio base station system, a control apparatus, and a radio apparatus. The present invention may be used in a radio base station system in which a plurality of radio apparatuses are connected in serial (cascade-connected) to a control apparatus.

BACKGROUND

FIG. 16 is a block diagram illustrating an exemplary configuration of a radio base station system. The radio base station system exemplified in FIG. 16 includes a radio network controller (RNC) 100, one or a plurality of radio equipment controllers (RECs) 200, and one or a plurality of pieces of radio equipment (REs) 300.

The REC 200 is connected to the RNC 100 in a mutually communicable manner by an interface called Iub. The REC 200 corresponds to a baseband processing unit which is one function (element) of a radio base station. Each RE 300 corresponds to a radio processing unit which is one function of the radio base station. In terms of effective use of an apparatus resource as the radio base station, the REs 300 can be installed separated from the baseband processing unit and as remote radio apparatuses that provide radio areas (cells or sectors) to remote locations, etc. At this time, the REs 300 are connected to the REC 200 in a mutually communicable manner using, for example, an electrical or optical serial interface (CPRI interface) called Common Public Radio Interface (CPRI).

For example, the REC 200 includes modulation and demodulation equipment (MDE) 201 and transmit/receive interfaces (TRX INFs) 202, and each RE 300 includes an amplifying unit 301, a transmit/receive unit (TRX) 302, and a transmit/receive antenna (ANT) 303. The transmit/receive interfaces 202 of the REC 200 are connected to the corresponding transmit/receive units 302 of the REs 300 by CPRI.

The MDE 201 modulates, by a predetermined modulation scheme, a downlink (DL) signal received from the RNC 100 and destined for a radio terminal present in a radio area (cell or sector) provided by an RE 300. The modulated signal is transferred to a transmit/receive interface 202 corresponding to the RE 300. Also, the MDE 201 demodulates, by a predetermined demodulation scheme, an uplink (UL) signal received from a transmit/receive interface 202 and transmits the demodulated signal to the RNC 100. Note that the DL and UL signals may include a control signal and user data.

The DL signal modulated by the MDE 201 is transmitted from the transmit/receive interface 202 to the transmit/receive unit 302 of the RE 300 over a CPRI link. In the RE 300, the transmit/receive unit 302 performs a predetermined radio transmission process, such as frequency conversion (up-conversion), on the signal received from the REC 200 and thereafter the amplifying unit 301 amplifies the signal to predetermined transmission power and then the signal is transmitted from the transmit/receive antenna 303 serving as a radio (Uu) interface.

On the other hand, a radio signal transmitted from a radio terminal present in a radio area provided by an RE 300 and received by the transmit/receive antenna 303 is subjected to low-noise amplification, etc., by the amplifying unit 301, and thereafter the signal is transmitted to the transmit/receive unit 302. Thereafter, the received radio signal is subjected to a predetermined radio reception process, such as frequency conversion (down-conversion), by the transmit/receive unit 302 and then the signal is transmitted to a corresponding transmit/receive interface 202 of the REC 200 by a protocol (CPRI link) on the CPRI interface. The signal received by the transmit/receive interface 202 of the REC 200 is transferred to the MDE 201 and demodulated by the MDE 201.

The above-described radio base station system can only allow an RE 300 to be directly connected to the REC 200 by a CPRI link.

(Patent Document 1) Published Japanese Translation of PCT Application No. 2007-511955

(Patent Document 2) Published Japanese Translation of PCT Application No. 2007-529926

(Patent Document 3) Japanese Patent Application Laid-Open No. 2007-306362

(Non-Patent Document 1) CPRI Specification V3.0 (Oct. 20, 2006), "Common Public Radio Interface (CPRI); Interface Specification", [searched on Apr. 25, 2008], Internet <URL: http://www.cpri.info/downloads/CPRI_v_3_0_2006-10-20.pdf>

SUMMARY

For example, the following system and apparatuses are used.

(1) A radio base station system can be used in which a plurality of radio apparatuses which are elements of a radio base station are cascade-connected to a control apparatus which is an element of the radio base station. The control apparatus includes: transmitting unit that transmits information to a communication link that passes through each of the radio apparatuses and is then received by the control apparatus, the information being updated each time passing through each of the radio apparatuses; and identifying unit that identifies the radio apparatuses in the cascade connection, based on an update status of the information having passed through each of the radio apparatuses.

(2) A control apparatus can be used that is in a radio base station system in which a plurality of radio apparatuses which are elements of a radio base station are cascade-connected to the control apparatus which is an element of the radio base station. The control apparatus includes: transmitting unit that transmits information to a communication link that passes through each of the radio apparatuses and is then received by the control apparatus, the information being updated each time passing through each of the radio apparatuses; and identifying unit that identifies the radio apparatuses in the cascade connection, based on an update status of the information having passed through each of the radio apparatuses.

(3) A radio apparatus can be used that is in a radio base station system in which a plurality of the radio apparatuses which are elements of a radio base station are cascade-connected to a control apparatus which is an element of the radio base station. The radio apparatus includes: identifier obtaining unit that receives information that is transmitted by the control apparatus to a communication link passing through each of the radio apparatuses and then being received by the control apparatus, and that is updated each time passing through the radio apparatuses, from a portion of the communication link on a side of its previous stage and obtaining an identifier based on the information; and transferring unit that makes an update according to the obtained identifier to the information and transfers the updated information to a portion of the communication link on a side of its subsequent stage.

Additional objects and advantages of the embodiment(s) will be set forth in part in the description which follows, and in part will be obvious from the description, or may be learned by practice of the embodiment(s). The object and advantages of the invention will be realized and attained by unit of the elements and combinations particularly pointed out in the appended claims.

It is to be understood that both the foregoing general description and the following detailed description are exemplary and explanatory and are not restrictive of the embodiment, as claimed.

DESCRIPTION OF EMBODIMENT(S)

An embodiment will be described below with reference to the drawings. Note, however, that the embodiment described below is merely exemplary in nature and is no way intended to exclude various modifications and technical applications that are not specified below. Namely, the present embodiment can be implemented by making various modifications thereto (e.g., by combining examples) without departing from the spirit and scope thereof.

(1) Embodiment (1.1) CPRI Protocol Stack Architecture

Figure 1:
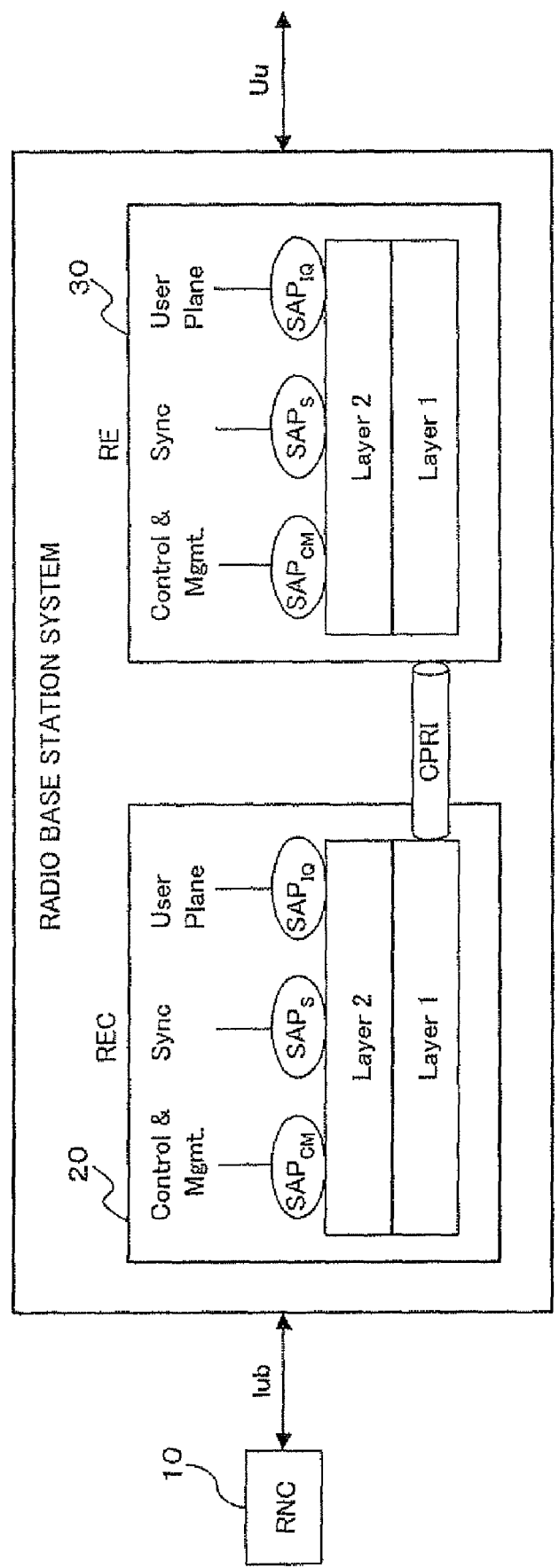
FIG. 1 is a diagram illustrating a radio base station system according to one embodiment, focusing attention on a CPRI protocol stack architecture.

FIG. 1 is a diagram illustrating a radio base station system according to one embodiment, focusing attention on a CPRI protocol stack architecture. The system illustrated in FIG. 1 exemplarily includes an REC (RE control apparatus) 20 connected to an RNC 10 in a mutually communicable manner by an Iub interface; and an RE 30 connected to the REC 20 in a mutually communicable manner.

As exemplified in FIG. 1, in the CPRI standard, the terms RE and REC respectively correspond, as previously described, to a remote radio apparatus and a baseband processing unit which are elements of a radio base station, and an interface between the RE and REC is a CPRI link.

Figure 2:
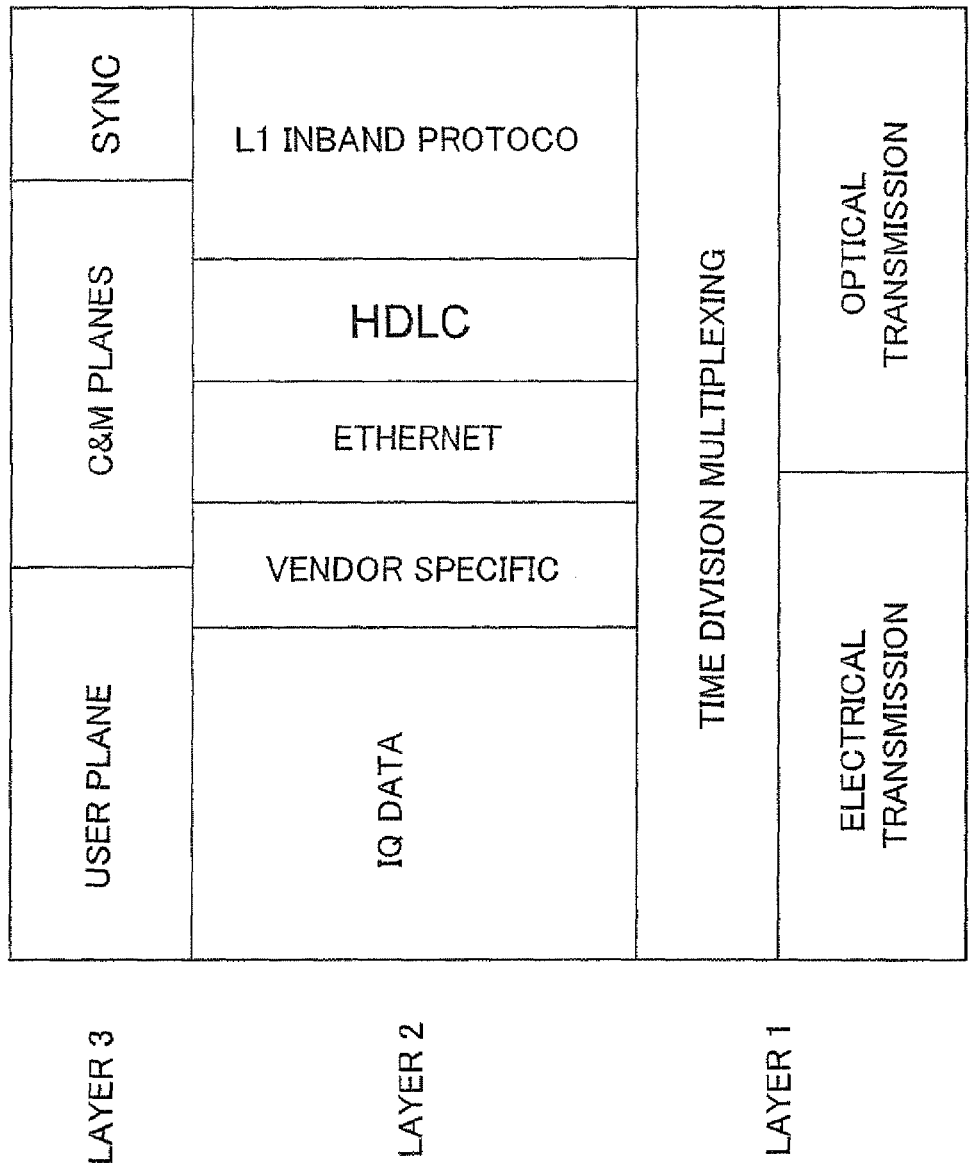
FIG. 2 is a diagram illustrating an example of a CPRI protocol stack.

As exemplified in FIG. 2, in the CPRI standard (protocol), as layer 2 (L2), IQ data, vendor-specific information (Vendor Specific), Ethernet (registered trademark), an HDLC (High-level Data Link Control procedure), an L1 inband protocol, etc., are defined (supported). As layer 1 (L1), time division multiplexing and electrical transmission or optical transmission of the L2 signals and information are defined (supported). Note that the CPRI standard does not provide any specific definition of a layer higher than the L2. FIGS. 1 and 2 exemplify that for a higher layer a service access point (SAP) such as a user plane, control and management planes, and synchronization information (SYNC) can be defined (supported).

In the CPRI protocol stack architecture exemplified in FIG. 2, a user plane signal (data) includes a baseband complex signal (IQ data) and vendor-specific information. The vendor-specific information is additionally defined information (time slot) and can be freely defined by REC and RE apparatus vendors.

A control and management (C&M) plane signal (data) includes, for example, vendor-specific information, a signal that requires high real-time performance, L3 protocol data to be transmitted on the HDLC (definition of which is not provided by the CPRI standard), Ethernet data, and L1 inband protocol data (for priority signaling data).

Data including the above-described user plane data, C&M plane data, synchronization information, and vendor-specific information, etc., is time division multiplexed and electrically or optically transmitted.

Figure 3:
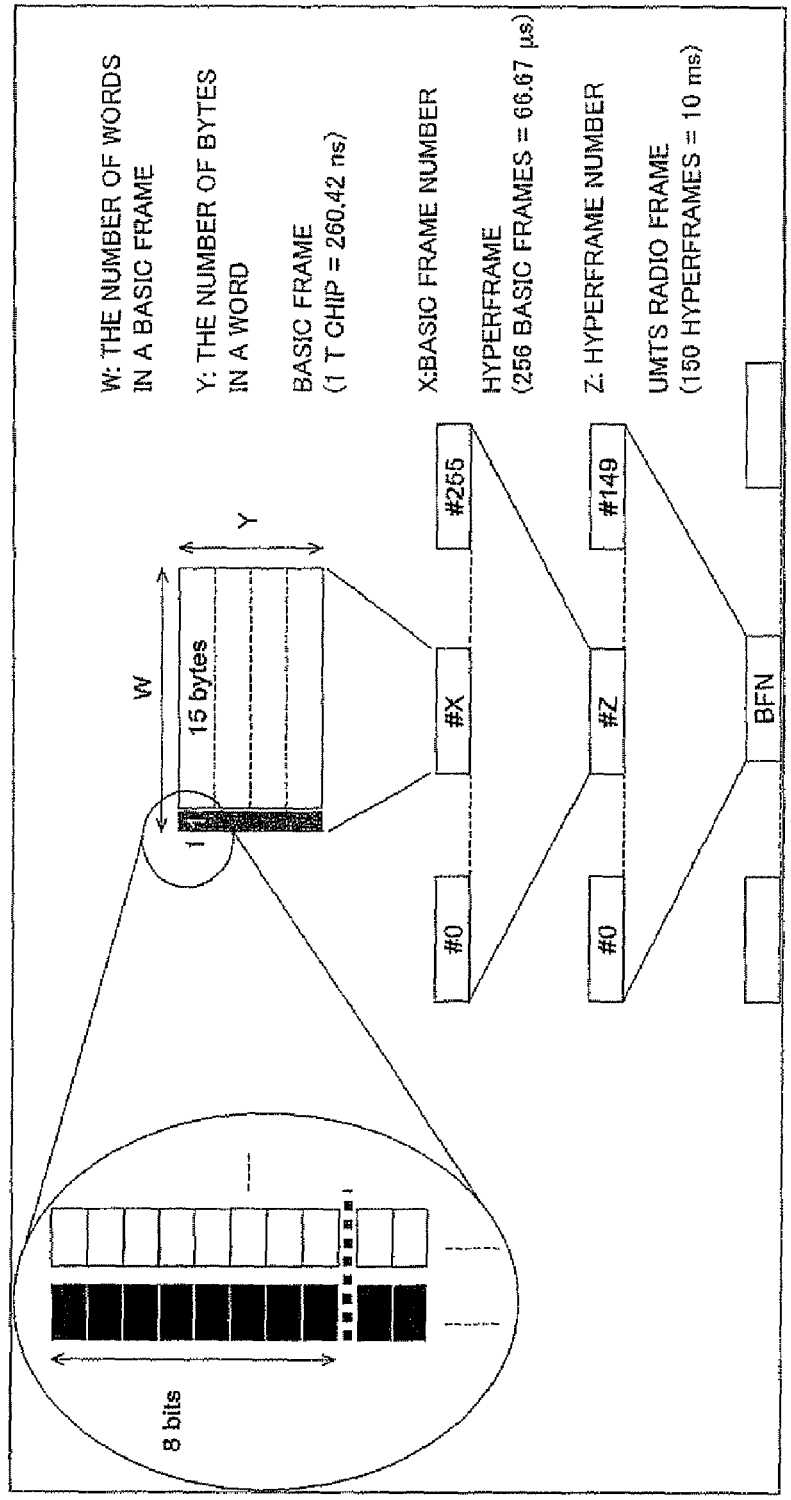
FIG. 3 is a diagram schematically describing exemplary time division multiplexing in a CPRI protocol.

In the time division multiplexing, for example, as illustrated in FIG. 3, 16 words (16 bytes) of number W=0 to 15 form a basic frame, 256 multiplexed basic frames form a hyperframe, and furthermore, 150 multiplexed hyperframes form a radio frame. The radio frame is a frame to be transmitted and received over a radio area (cell or sector) provided by the RE.

Figure 4:
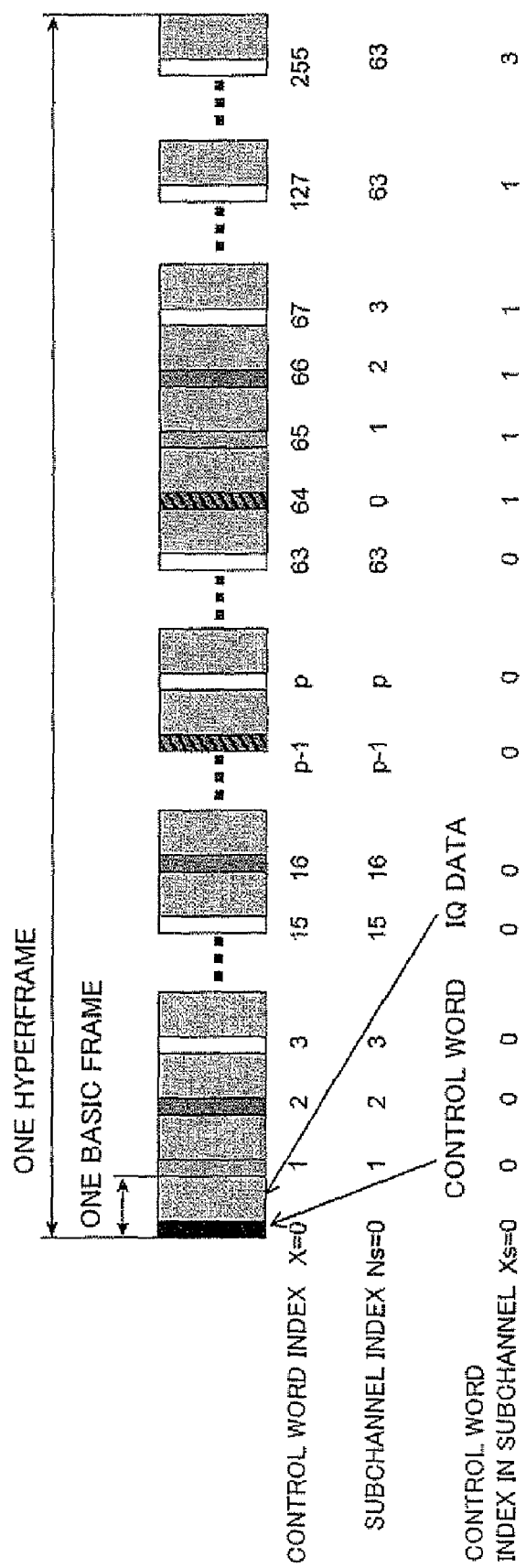
FIG. 4 is a diagram illustrating an exemplary frame format in the CPRI protocol.

As exemplified in FIG. 4, the first byte of a basic frame is a control word used to transmit C&M plane data and the remaining 15 bytes are data words used to transmit user plane data such as IQ data. Note that the control word takes on a sense of a header by organizing 256 bytes of one hyperframe into 4 bytes×64 subchannels.

(1.2) Detail of the Radio Base Station System

Figure 5:
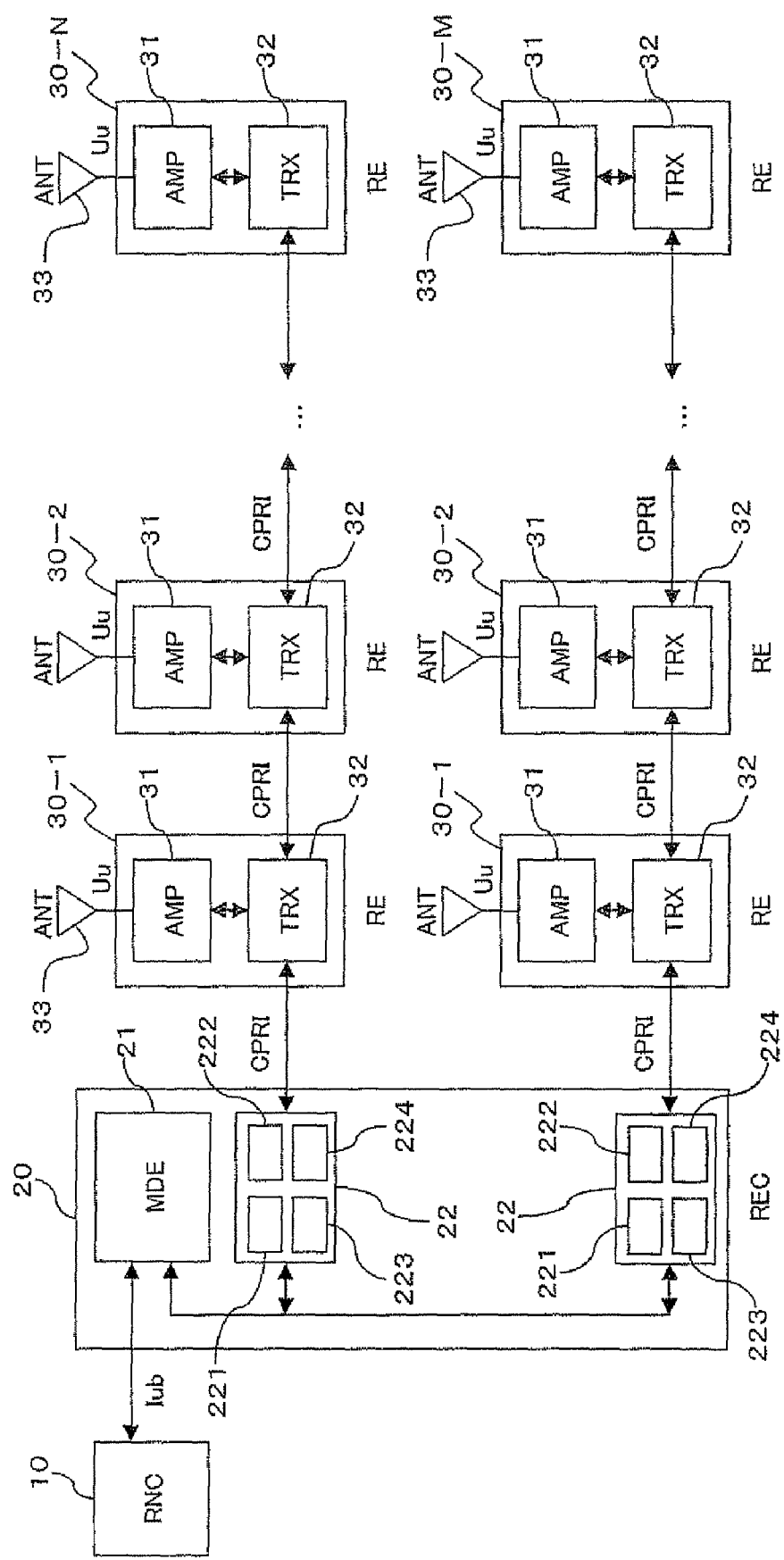
FIG. 5 is a diagram illustrating a detailed exemplary configuration of a radio base station system according to the embodiment.

FIG. 5 is a diagram illustrating a detailed exemplary configuration of a radio base station system according to the above-described embodiment. The radio base station system illustrated in FIG. 5 exemplarily includes an RNC 10, an REC 20, a plurality of REs 30-1 to 30-N that make a first RE group, and a plurality of REs 30-1 to 30-M that make a second RE group. Note that N and M each are an integer of two or more and may be N=M. Note also that although there are two RE groups in FIG. 5, there may be one RE group or may be three or more RE groups. In the RE groups, when a distinction is not made between the REs 30-1 to 30-N (or M), they are simply denoted as "RE 30".

The RNC 10 is connected to one or a plurality of RECs 20 in a mutually communicable manner by an Iub interface. The REC(s) 20 is connected to one or a plurality of RE groups in a mutually communicable manner by CPRI. The RE groups each have a plurality of REs 30-1 to 30-N (or M) as group members and the group members 30 are connected in serial (tandem) to each other by CPRI. This connection form (topology) is also called chain connection or cascade connection.

Accordingly, communication by the Iub interface (protocol) is enabled between the RNC 10 and the REC 20 and communication by the CPRI protocol is enabled between the REC 20 and the REs 30 and between the REs 30. By these communications, the RNC 10 can perform control, operations administration maintenance (OAM), etc., on the REC 20 and the REs 30.

More specifically, the REC 20 has a function as a baseband processing unit and exemplarily includes modulation and demodulation equipment (MDE) 21 and transmit/receive interfaces (TRX INFs) 22, the number of which corresponds to the number of RE groups. Each RE 30 includes an amplifying unit (AMP) 31, a transmit/receive unit (TRX) 32, and a transmit/receive antenna 33.

In the REC 20, the MDE 21 modulates, by a predetermined modulation scheme, a DL signal received from the RNC 10 and destined for a radio terminal present in a radio area (cell or sector) provided by an RE 30. The modulated signal is transferred to a transmit/receive interface 22 corresponding to an RE group to which the RE 30 belongs. Also, the MDE 21 demodulates, by a predetermined demodulation scheme, an uplink (UL) signal received from a transmit/receive interface 22 and transmits the demodulated signal to the RNC 10. Note that the DL and UL signals can include a control signal and user data.

The DL signal modulated by the MDE 21 is transmitted from the transmit/receive interface 22 to the transmit/receive unit 32 of the RE 30 over a CPRI link. In an RE 30, a transmit/receive unit 32 performs a predetermined radio transmission process, such as frequency conversion (up-conversion), on a signal received from the REC 20 or an RE 30 of its previous stage, and thereafter, an amplifying unit 31 amplifies the signal to predetermined transmission power and then the signal is transmitted from a transmit/receive antenna 33.

On the other hand, a radio signal transmitted from a radio terminal present in a radio area provided by an RE 30 and received by a transmit/receive antenna 33 is subjected to low-noise amplification, etc., by an amplifying unit 31, and thereafter the signal is transmitted to a transmit/receive unit 32. Thereafter, the received radio signal is subjected to a predetermined radio reception process, such as frequency conversion (down-conversion), by the transmit/receive unit 32 and then the signal is transmitted to a corresponding transmit/receive interface 22 of the REC 20 or a transmit/receive unit 32 of an RE 30 of its previous stage over a CPRI link. The signal received by the transmit/receive interface 22 of the REC 20 is transferred to the MDE 21 and demodulated by the MDE 21.

Each transmit/receive interface 22 is connected, by CPRI, to a transmit/receive unit 32 of the first RE 30-1 belonging to a corresponding RE group and communicates with the transmit/receive unit 32 over a CPRI link. For example, a transmit/receive interface 22 transmits a modulated signal received from the MDE 21,-to a transmit/receive unit 32 of a corresponding first RE 30-1 over a CPRI link. Also, the transmit/receive interface 22 receives, over the CPRI link, a modulated signal transmitted from the transmit/receive unit 32 of the first RE 30-1 and transmits the signal to the MDE 21.

Hence, each transmit/receive interfaces 22 has a function of generating and transmitting/receiving a basic frame and a hyperframe, which are already described, to be transmitted on a CPRT link which is an example of a predetermined communication link. Thus, the transmit/receive interfaces 22 can generate and transmit/receive control words (vendor-specific information) that are based on the CPRI standard.

The vendor-specific information is an example of information that can be updated by each RE 30. Part or all of such information is defined as information to be updated by an RE 30 each time passing through the RE 30. By a transmit/receive interface 22 transmitting the information to a DL CPRI link, the transmit/receive interface 22 can identify REs 30 in a cascade connection, based on an update status of the information having passed through each RE 30.

Hence, as exemplified in FIG. 5, each transmit/receive interface 22 has a function as a transmit unit 221 that transmits vendor-specific information (control words), which is an example of the above-described information, to a CPRI link and a function as an identifying unit 222 that performs the above-described identification. Note that the function as the identifying unit 222 may be shared between the transmit/receive interfaces 22.

In each RE 30, a transmit/receive unit 32 has a radio communication function and a function of communication by the CPRI protocol (CPRI communication) which is already described. The radio communication function enables radio communication via a transmit/receive antenna 33 and the CPRI communication function enables communication with the REC 20 (transmit/receive interface 22) or another RE 30 (transmit/receive unit 32) over a CPRI link.

As an example of the radio communication function, each transmit/receive unit 32 has a predetermined radio transmission/reception processing function such as frequency conversion (up-conversion) of a DL signal to be transmitted to an amplifying unit 31 and frequency conversion (down-conversion) of a UL signal received from the amplifying unit 31.

Figure 6:
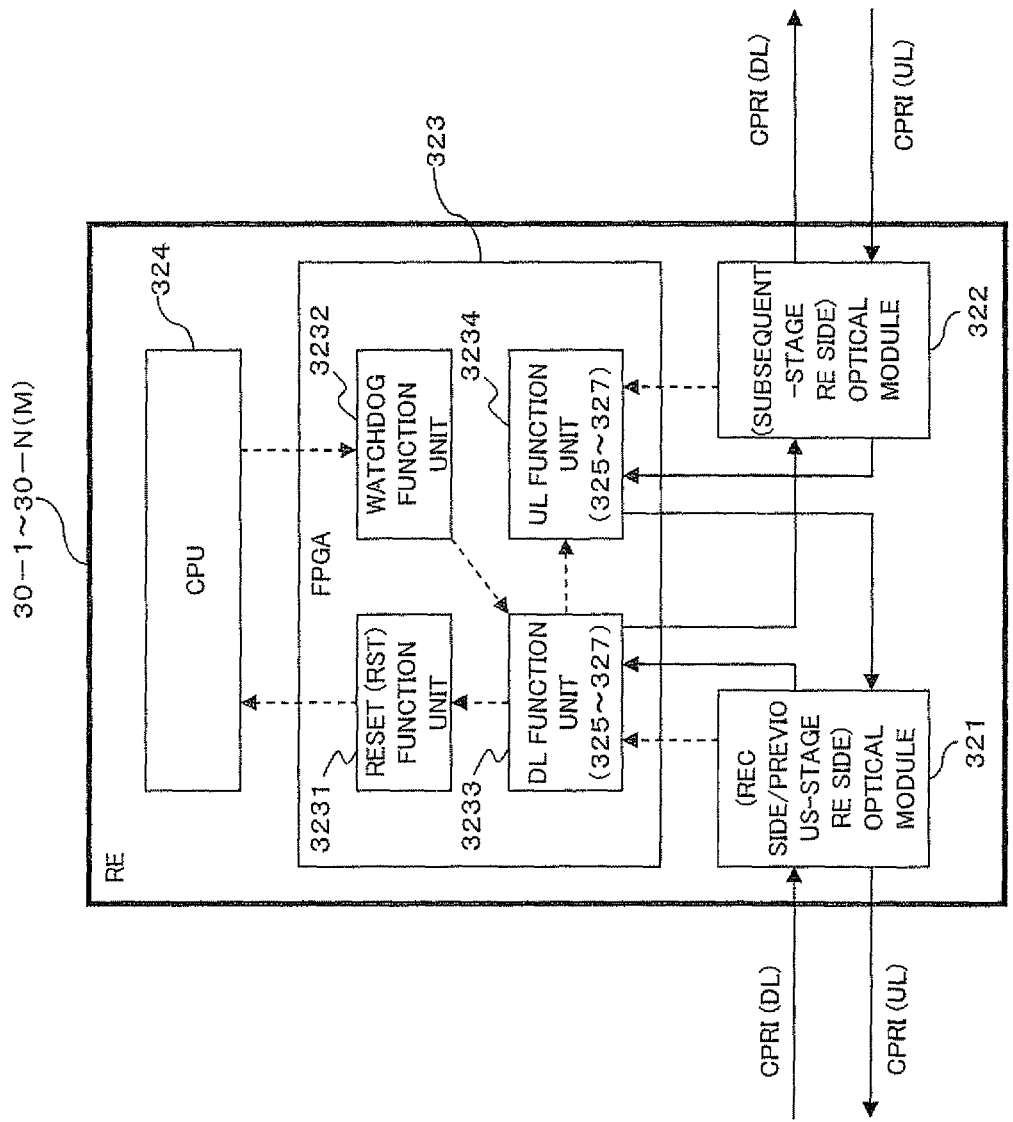
FIG. 6 is a block diagram illustrating an exemplary configuration of an RE exemplified in FIG. 5.

Taking a look at the CPRI communication function, each transmit/receive unit 32 includes, as illustrated in FIG. 6, for example, optical modules 321 and 322, a field programmable gate array (FPGA) 323, and a central processing unit (CPU) 324. Furthermore, the FPGA 323 includes, for example, a reset (RST) function unit 3231, a watchdog function unit 3232, a DL function unit 3233, and a UL function unit 3234. Note that the FPGA 323 may be implemented as an individual integrated circuit (an LSI, etc.).

The optical modules 321 and 322 each are provided for when CPRI link communication is performed by an optical signal, and have a photoelectric conversion function that converts a receive optical signal into an electrical signal and converts a transmit electrical signal into an optical signal.

In the present example, the optical module 321 is an optical interface for connection with the REC 20 (transmit/receive interface 22) or an RE 30 (transmit/receive unit 32) of its previous stage, and the optical module 322 is an optical interface for connection with an RE 30 (transmit/receive unit 32) of its subsequent stage. Note that the previous stage indicates a side closer to the REC 20 (UL direction) when taking a look at a certain RE 30, and the subsequent stage indicates a side farther from the REC 20 (DL direction).

The optical module 321 monitors whether there is abnormality in a CPRI link (DL) on the side of the REC 20 or the previous-stage RE 30 and the optical module 322 monitors whether there is abnormality in a CPRI link (UL) on the side of the subsequent-stage RE 30. Whether there is abnormality in the DL CPRI link is reported to the DL function unit 3233 of the FPGA 323 and whether there is abnormality in the UL CPRI link is reported to the UL function unit 3234 of the FPGA 323. That is, the optical modules 321 and 322 are used as an example of a link abnormality detecting unit 320 that detects abnormality in the CPRI link from the previous or subsequent stage. Note that in the present example a state in which a DL/UL optical input cannot be detected is detected as abnormality in the CPRI link.

In the FPGA 323, the watchdog function unit 3232 periodically monitors normality in the operations (software) of the CPU 324 and the FPGA 323. When software abnormality is detected, the detection of software abnormality is reported, for example, to the DL function unit 3233. That is, the watchdog function unit 3232 is used as an example of a software abnormality detecting unit that detects software abnormality in the RE 30.

The DL function unit 3233 receives DL CPRI link data transmitted from the optical module 321 and extracts data (including a control word) and performs data transmission to the optical module 322. These processes can be performed, for example, in a bit unit. At this time, the DL function unit 3233 obtains and manages an RE identifier by referring to vendor-specific information in the control word and sets information indicating that the RE identifier is already obtained to the vendor-specific information (updates the vendor-specific information). When abnormality in the DL CPRI link or the software abnormality is detected, the DL function unit 3233 notifies the REC 20 of the abnormality detection (alarm). For this alarm notification, for example, vendor-specific information in the control word can be used.

Note that when abnormality in the DL CPRI link is detected by the optical module 321, the DL function unit 3233 generates a basic frame and a hyperframe, which are already described, and can include alarm notification information in the control word (vendor-specific information). The generated frames may be transmitted to the subsequent-stage (DL) side via the optical module 322 or may be transmitted to the previous-stage (UL) side via the UL function unit 3234 and the optical module 321. In either case, alarm notification to the REC 20 is enabled. Note that in the case of transmitting the frames to the subsequent-stage side, an RE 30 of the subsequent stage can also recognize the CPRI link abnormality occurred on the previous-stage side.

The UL function unit 3234 receives UL CPRI link data transmitted from the optical module 322 and performs data extraction and data transmission to the optical module 321. These processes can also be performed, for example, in a bit unit. Also, when abnormality in the DL CPRI link is detected by the optical module 321, the UL function unit 3234 generates a basic frame and a hyperframe, which are already described, and can include alarm notification information in the control word (vendor-specific information). The generated frames are transmitted to the previous-stage (REC 20) side via the optical module 321.

The above-described DL function unit 3233 and UL function unit 3234 can communicate with each other. For example, data obtained by the DL function unit 3233 can be transmitted to the UL function unit 3234 and then transmitted to the UL CPRI link. Therefore, the alarm notification information (vendor-specific information) obtained by the DL function unit 3233, as described above, can be transmitted to the UL CPRI link that goes toward the REC 20, from the UL function unit 3234.

In other words, the function units 3233 and 3234 each function as an example of an identifier obtaining unit 325 that obtains an RE identifier based on control words (vendor-specific information) received from the CPRI link on the previous-stage side and also function as an example of a transferring unit 326 that makes an update according to the obtained RE identifier to the control words (vendor-specific information) and transfers the control words to the CPRI link on the subsequent-stage side. Also, the function units 3233 and 3234 each are used as an example of a link/software abnormality notifying unit 327 that notifies, when the above-described CPRI link abnormality or software abnormality is detected, the REC 20 of the abnormality (alarm) The function of the notifying unit 327 can also be provided in the FPGA 323 as individual functions of link abnormality notification and software abnormality notification.

The reset function unit 3231 resets (restarts) the CPU 324 and the FPGA 323 when data extracted by the DL function unit 3233 is a reset instruction. The reset instruction is issued when the REC 20 receives the above-described software abnormality alarm (ALM) notification. This reset instruction can also use, for example, vendor-specific information in the control word.

That is, the REC 20 (transmit/receive interface 22) additionally has a function as a software reset control unit 224 (see FIG. 5) that transmits, when receiving notification about software abnormality, software reset information destined for an RE 30 identified by the RE identifier to the CPRI link.

Note that, in FIG. 5, an amplifying unit 31 of each RE 30, for example, amplifies a DL radio signal received from a transmit/receive unit 32 to predetermined transmission power and the signal is transmitted from a transmit/receive antenna 33 to a radio area, and also performs a low-noise amplification on a radio signal received by the transmit/receive antenna 33 and transmits the signal to the transmit/receive unit 32.

Each transmit/receive antenna 33 is a radio (Uu) interface that transmits a DL radio signal to a radio area and also receives a UL radio signal transmitted from the radio area.

(1.3) Operation (OAM)

Figure 7:
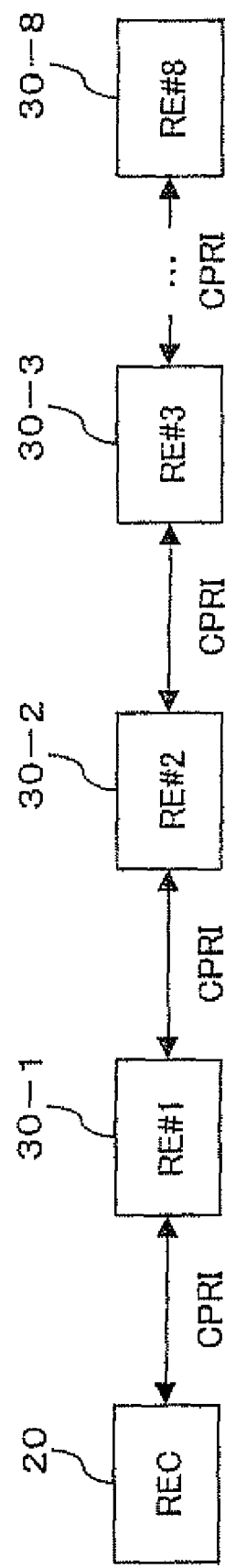
FIG. 7 is a diagram exemplifying a simplified cascade connection according to the embodiment.

An operation (OAM of the REs 30 by CPRI communication) of the above-described radio base station system will be described in detail below. Note that, in the following, for simplification of description, as exemplified in FIG. 7, one RE group is made up of eight (i.e., N=M=8) REs 30-1 to 30-8 (RE#1 to #8) and description is made taking a look at any one of RE groups.

First, to perform OAM on individual REs 30, an REC 20 recognizes the individual REs 30 (the number of REs, etc.) that are cascade-connected to the REC 20. Each RE 30 recognizes which location in the cascade connection the RE is at (what number the RE 30 is from the REC 20). After these recognitions are made possible, with the individual REs being identified, the REC 20 can receive information notification, such as alarm notification, from the individual REs 30, or can perform control, such as a reset instruction, on the individual REs 30.

Hence, first, to enable the recognitions, for example, as illustrated in the following table 1, in the REC 20 and each RE 30, part of vendor-specific information in CPRI control words is defined (assigned) as RE identifiers.

TABLE 1

Definition of Vendor-specific Information (Allocation Example)

| Subchannel Number | Xs = 0 (8 bits) | Xs = 1 (8 bits) | Xs = 2 (8 bits) | Xs = 3 (8 bits) |
|---|---|---|---|---|
| 16 | RE#1 Identifier | RE#2 Identifier | RE#3 Identifier | RE#4 Identifier |
| 17 | RE#5 Identifier | RE#6 Identifier | RE#7 Identifier | RE#8 Identifier |
| 18 | RE#1 DL-ALM | RE#2 DL-ALM | RE#3 DL-ALM | RE#4 DL-ALM |
| 19 | RE#5 DL-ALM | RE#6 DL-ALM | RE#7 DL-ALM | RE#8 DL-ALM |
| 20 | RE#1 UL-ALM | RE#2 UL-ALM | RE#3 UL-ALM | RE#4 UL-ALM |
| 21 | RE#5 UL-ALM | RE#6 UL-ALM | RE#7 UL-ALM | RE#8 UL-ALM |
| 22 | RE#1 S-ALM | RE#2 S-ALM | RE#3 S-ALM | RE#4 S-ALM |
| 23 | RE#5 S-ALM | RE#6 S-ALM | RE#7 S-ALM | RE#8 S-ALM |
| 24 | RE#1 RST | RE#2 RST | RE#3 RST | RE#4 RST |
| 25 | RE#5 RST | RE#6 RST | RE#7 RST | RE#8 RST |

Specifically, exemplarily, control words (vendor-specific information) from index Xs=0 of subchannel number=16 to index Xs=3 of subchannel number=17 are defined, in one byte (8 bits) unit, as RE#i (i=1 to 8) identifier fields.

Note that table 1 exemplifies that control words (vendor-specific information) from index Xs=0 of subchannel number=18 to index Xs=3 of subchannel number=21 can be defined, in one byte unit, as UL and DL alarm (ALM) information notification fields of the respective REs 30.

Similarly, table 1 exemplifies that control words (vendor-specific information) from index Xs=0 of subchannel number=22 to index Xs=3 of subchannel number=23 can be defined, in one byte unit, as software alarm (S-ALM) information notification fields of the respective REs 30. Furthermore, table 1 exemplifies that control words (vendor-specific information) from index Xs=0 of subchannel number=24 to index Xs=3 of subchannel number=25 can be defined, in one byte unit, as reset instruction fields for the respective REs 30.

In the REC 20, the definitions (assignments) exemplified in table 1 can be held and managed by, for example, the transmit/receive interface 22, and in each RE 30, the definitions (assignments) can be held and managed by, for example, an FPGA 323 (DL function unit 3233).

Note that although, in the example of table 1, RE identifier, alarm information, and reset instruction fields are assigned for each RE 30 in one byte unit, such assignment is merely an example; the assignment may be performed in a unit of fewer or more bits. For example, it is also possible to assign RE identifier, alarm information, and reset instruction fields for each RE 30 in one bit unit.

By making the assignment unit smaller, a larger number of assignments to the REs 30 are enabled. On the other hand, by making the assignment unit larger, the error immunity of CPRI communication (assignment of an RE identifier, alarm notification, and reset control) can be improved. In RE identifier assignment, information that is incremented each time each RE 30 obtains an identifier can also be used.

(1.3.1) Recognition of Each RE 30 (Identifier Assignment)

Under such definitions (assignments) as those described above, when the REC 20 (transmit/receive interface 22) recognizes each RE 30 (assigns an RE identifier), the REC 20 (transmit/receive interface 22) can use, as an example, a method such as that illustrated below.

Figure 8:
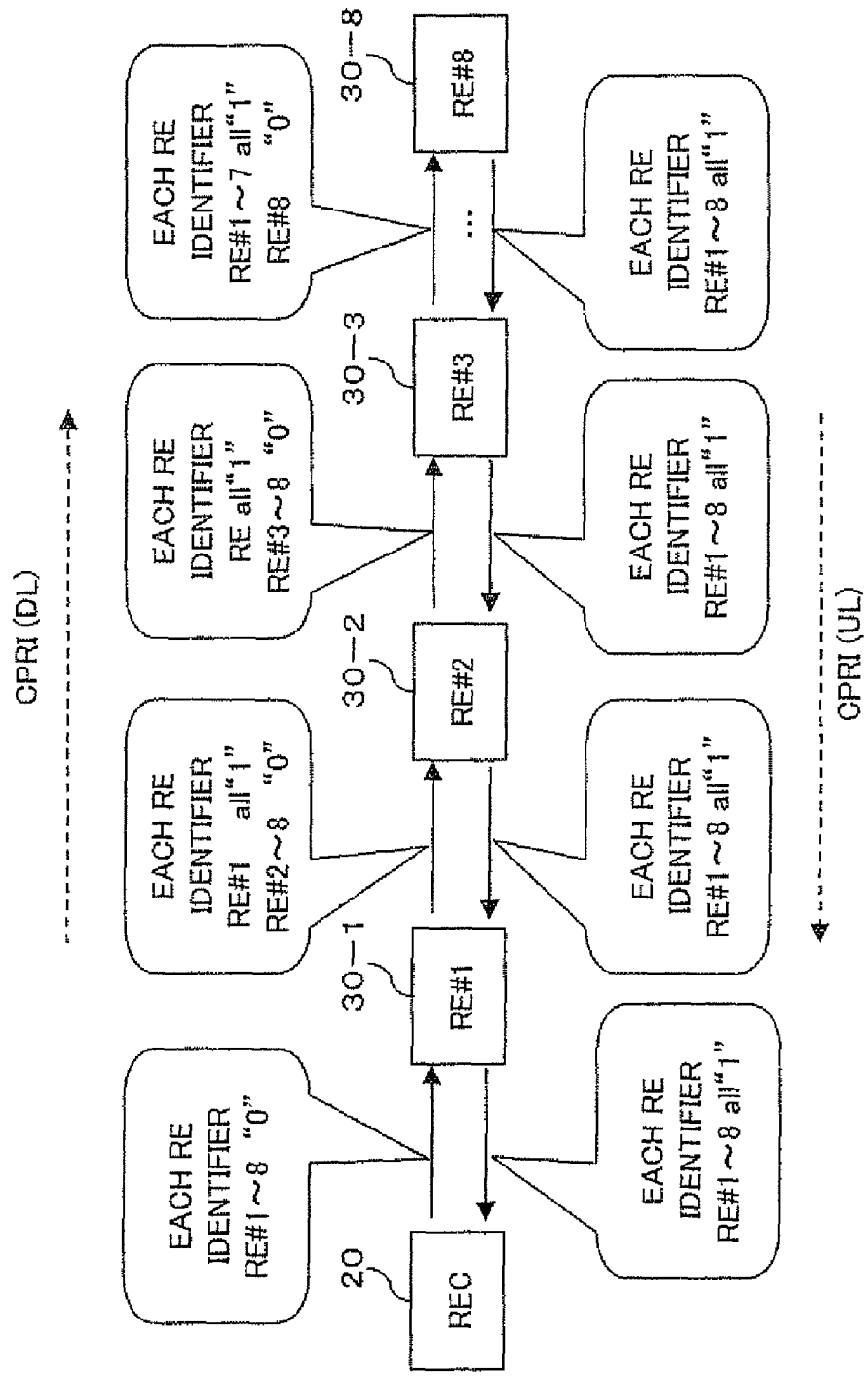
FIG. 8 is a schematic diagram describing an operation (RE recognition process) of the radio base station system of the embodiment.

Specifically, as exemplified in FIG. 8, the REC 20 (transmit/receive interface 22) transmits control words in which all of the RE#i identifiers for eight REs are set to a "not assigned" state (e.g., all "0"), to an RE 30-1 over a DL CPRI link. Note that this transmission is performed after synchronization (frame synchronization) of optical links (DL and UL CPRI links) by the optical modules 321 and 322 is established in each RE 30. The synchronization establishment is performed using synchronization information (SYNC) which is already described (process 1011 in FIG. 9).

The DL and UL CPRI links pass through each RE 30. By an RE 30 of the last stage transmitting back information received over the DL CPRI link to the UL CPRI link, the REC 20 can receive the information transmitted to the DL CPRI link, over the UL CPRI link.

Figure 9:
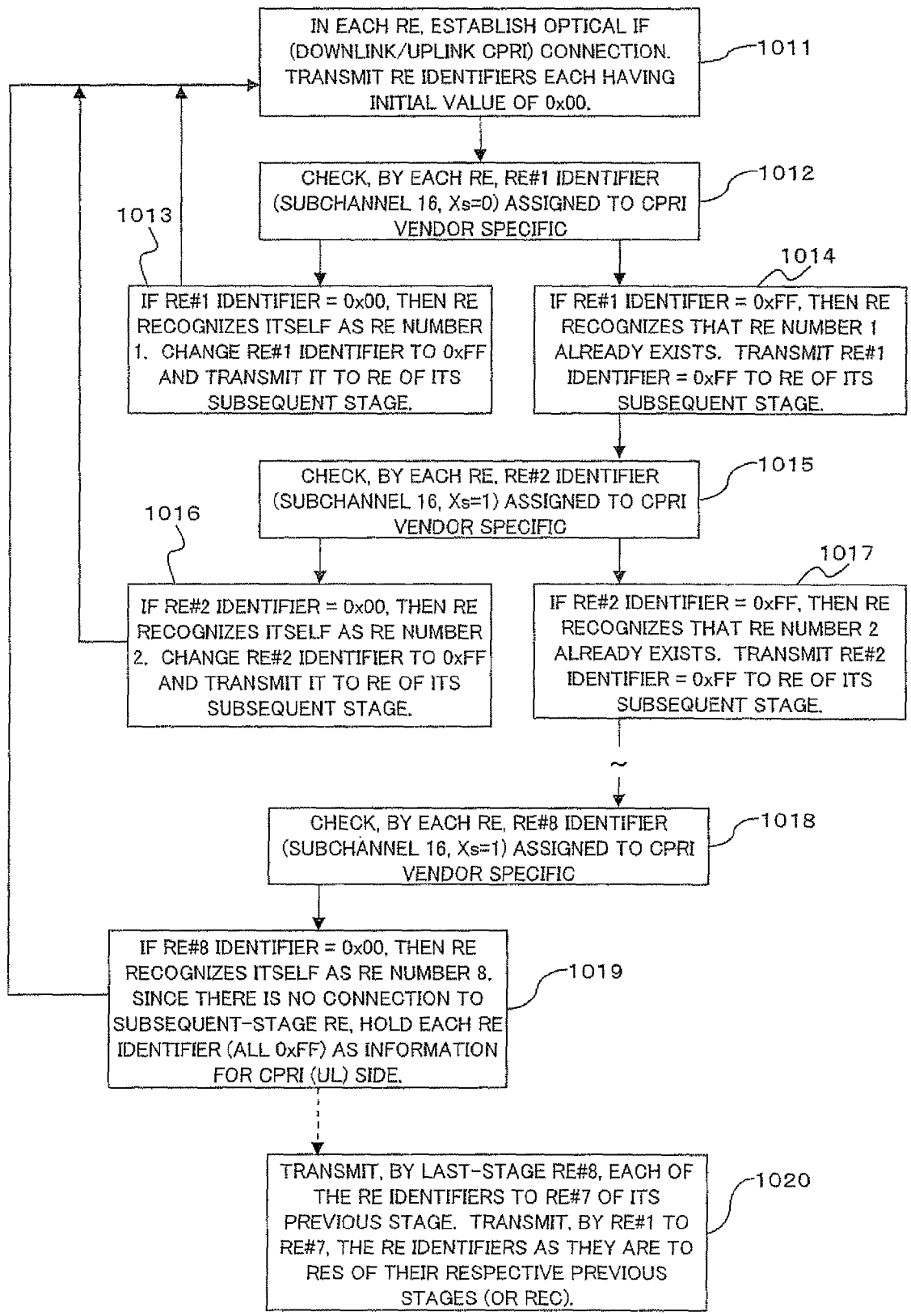
FIG. 9 is a flowchart describing the operation (RE recognition process) of the radio base station system of the embodiment.
Figure 14:
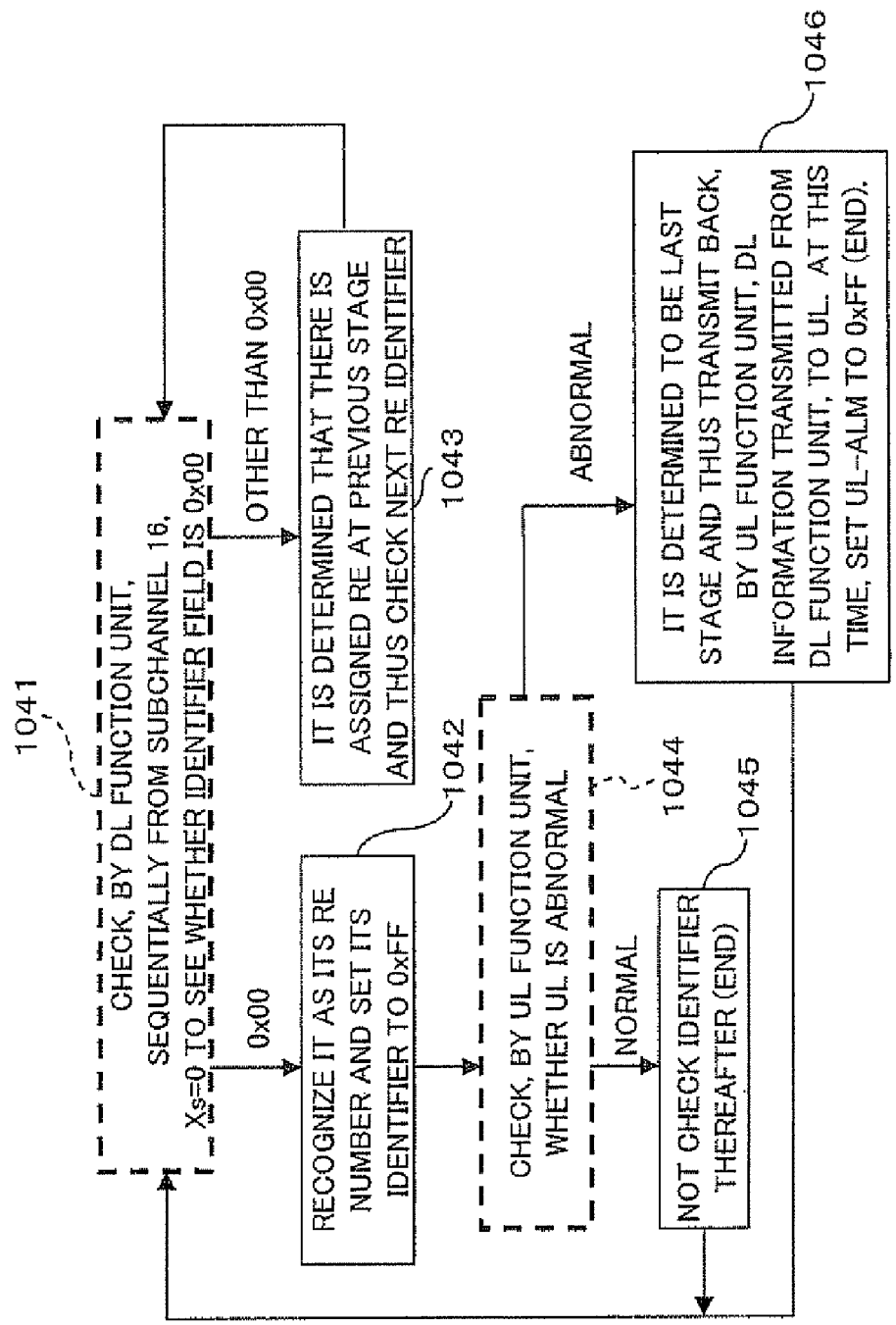
FIG. 14 is a flowchart describing an operation (RE recognition process) of the RE of the embodiment.

Each RE 30 (DL function unit 3233) refers to vendor-specific information (RE#1 to #8 identifier fields) in the control words received from the DL CPRI link to check whether there is an identifier field with all "0" (process 1012 in FIG. 9 and process 1041 in FIG. 14). If there is an identifier field with all "0", then the RE#i identifier indicates a "not assigned" state and thus the RE 30 can be assigned with the RE#i identifier (RE number). In the example of FIG. 8, since the RE 30-1 is the first RE, an RE#1 identifier field is supposed to be all "0".

Therefore, the RE 30-1 (DL function unit 3233) obtains 1 as its RE identifier (RE number) and recognizes and manages the RE identifier (process 1042 in FIG. 14). At this time, the RE 30-1 (DL function unit 3233) changes the value of the RE#1 identifier field from the "not assigned" state (all "0") to an "assigned" state (e.g., all "1") and then transmits the control words to an RE 30-2 of its subsequent stage (process 1013 in FIG. 9 and process 1042 in FIG. 14).

The RE 30-2 (DL function unit 3233) similarly checks the setting states of the RE#i identifier fields sequentially from the index Xs=0 of the subchannel number=16 in the control words received from the DL CPRI link (process 1015 in FIG. 9 and process 1041 in FIG. 14). If there is an RE#i identifier field with a "not assigned" state (all "0"), then the DL function unit 3233 (RE 30-2) can be assigned with the RE#i identifier.

In the example of FIG. 8, since the RE#1 identifier field is all "1" and the next RE#2 identifier field is all "0", the RE 30-2 (DL function unit 3233) can be assigned with an RE#2 identifier=2. Therefore, the RE 30-2 (DL function unit 3233) obtains 2 as its RE#2 identifier and recognizes and manages the RE#2 identifier (process 1042 in FIG. 14). Also, the RE 30-2 (DL function unit 3233) changes the value of the RE#2 identifier field from the "not assigned" state (all "0") to an "assigned" state (e.g., all "1") and then transmits the control words to an RE 30-3 of its subsequent stage (process 1016 in FIG. 9).

Note that when an RE#i identifier field in the control words received from the DL CPRI link is all "1", it indicates that an RE identifier (number) is already obtained by an RE 30 on the previous-stage side. In this case, an RE 30 (DL function unit 3233) leaves the RE#i identifier field with all "1" as it is and sequentially checks the rest of RE#2 to #8 identifier fields to see whether there is one with a "not assigned" state (all "0") (processes 1014 and 1017 in FIG. 9 and process 1043 in FIG. 14).

After that, similarly, each RE 30 (DL function unit 3233) checks the setting states of the RE#i identifier fields and is assigned with an RE#i identifier with all "0", and changes an RE#i identifier field whose identifier has been assigned to the RE 30, to all "1" and then transmits the control words to an RE 30 of its subsequent stage.

Accordingly, in the example of FIG. 8, an RE 30-8 (DL function unit 3233) which is the last one in the cascade connection receives control words in which RE#1 to RE#7 identifier fields=all "1" and RE#8 identifier field=all "0". Thus, the RE 30-8 (DL function unit 3233) is assigned with RE#8 identifier=8 and changes the RE#8 identifier field from all "0" to all "1" (processes 1018 and 1019 in FIG. 9 and process 1042 in FIG. 14).

Here, since the RE 30-8 is the last one in the cascade connection, UL and DL CPRI communications for a subsequent-stage RE are terminated by an optical module 322 thereof. In this case, the DL function unit 3233 of the RE 30-8 transmits DL CPRI link data to a UL function unit 3234 and the data is transmitted back (fed back) to the UL CPRI link from the UL function unit 3234.

Thus, the RE 30-8 transmits back the control words (vendor-specific information) set to the RE#1 to RE#8 identifiers (all "1"), as they are to the UL CPRI link. At this time, since the RE 30-8 (UL function unit 3234) is in a state of abnormality in the UL CPRI link from a subsequent-stage RE 30, the RE 30-8 (UL function unit 3234) may set UL-ALM information in the above-described table 1 corresponding to the RE#8 identifier to all "1" (from an "abnormal" route of process 1044 in FIG. 14 to process 1046).

Accordingly, the REC 20 can confirm that the RE 30-8 is the last RE in the cascade connection. Note that the UL function units 3234 of those REs 30 other than the last RE 30-8 do not check other RE#i identifiers when the UL CPRI link from their respective subsequent-stage REs 30 is normal (from "normal" route of process 1044 in FIG. 14 to process 1045).

In the UL CPRI link, each RE 30 (UL function unit 3234) transmits (passes through) RE#i identifier fields in control words received thereby, as they are to the side of the REC 20 (process 1020 in FIG. 9).

Then, since the RE#1 to RE#8 identifier fields in the control words (vendor-specific information) received by the REC 20 from the UL CPRI link are all "1", the REC 20 can recognize (identify) that the eight REs 30 are cascade-connected to each other and manage the REs 30. Also, the REC 20 and each RE 30 can recognize and manage which location (what number) in the cascade connection each RE 30 is at.

Therefore, for example, even when an RE 30 is added to the cascade connection or the cascade connection is changed by an RE 30 being removed, the REC 20 can again recognize the number of REs 30 and the locations of the REs 30 by the above-described CPRI communication. Namely, while existing REs 30 continue communication with the REC 20, communication between the REC 20 and an added or removed RE 30 can be selectively established or disconnected.

Since the REC 20 and each RE 30 are cascade-connected, by installing the REs 30 in remote locations, radio coverage as a radio base station system can be expanded.

Furthermore, with the individual REs 30 being identified, the REC 20 (transmit/receive interface 22) can individually perform DL and UL CPRI communication with the REs 30. For example, by UL CPRI communication, each RE 30 can individually notify the REC 20 of abnormality in the UL/DL CPRI link or abnormality in software of the RE 30.

Accordingly, the REC 20 can identify between which REs 30 the abnormality has occurred in the CPRI link or can identify which RE 30 the software abnormality has occurred in. Also, the REC 20 can individually reset, by DL CPRI communication, an RE 30 where the software abnormality has occurred.

That is, the REC 20 (transmit/receive interface unit 22) additionally has a function as a control unit 223 (see FIG. 5) that performs, under the identification, control of individual OAM on each RE 30, using the CPRI link. Note that the functions of the already-described respective units 221 to 224 exemplified in FIG. 5 may be included in the REC 20 as functions of individual control units. Note also that in the present example the OAM indicates inclusion of any one of operations, administration, and maintenance or a combination of two or more thereof and thus does not indicate that all of operations, administration, and maintenance are required. Also, it is not intended to exclude inclusion of a process other than these three.

The following describes, by item by item, abnormality (alarm) notification from the individual REs 30 to the REC 20 as an example of OAM by UL CPRI communication, and reset control from the REC 20 to the individual REs 30 as an example of OAM by DL CPRI communication. Note that alarm notification includes one or both of the case in which abnormality occurs in the DL/UL CPRI link and the case in which software abnormality in an RE 30 occurs.

(1.3.2) Abnormality (Alarm) Notification from an RE 30 to the REC 20

As described above, each RE 30 can recognize and manage what number in the cascade connection the RE 30 is connected. Hence, for example, part of vendor-specific information in CPRI control words is defined (assigned) as alarm (ALM) information fields for the respective REs 30, as exemplified in the above-described table 1.

Then, when abnormality in the CPRI link (UL/DL) or software has occurred in an RE 30, the RE 30 where the abnormality has occurred changes a corresponding ALM information field in the UL control words from a state indicating non-occurrence of abnormality (all "0") to a state indicating occurrence of abnormality (all "1") and then transmits the control words to the side of the REC 20. Accordingly, by the REC 20 receiving the UL control words, the REC 20 can recognize in which location in the cascade connection the CPRI link abnormality has occurred or in which RE 30 the software abnormality has occurred.

A specific example is provided below. In the REC 20 and each RE 30, as exemplified in the above-described table 1, control words (vendor-specific information) from the index Xs=0 of the subchannel number=18 to the index Xs=3 of the subchannel number=21 are defined (assigned), in one byte (8 bits) unit, as DL/UL-ALM information fields of RE#i (i=1 to 8).

Figure 10:
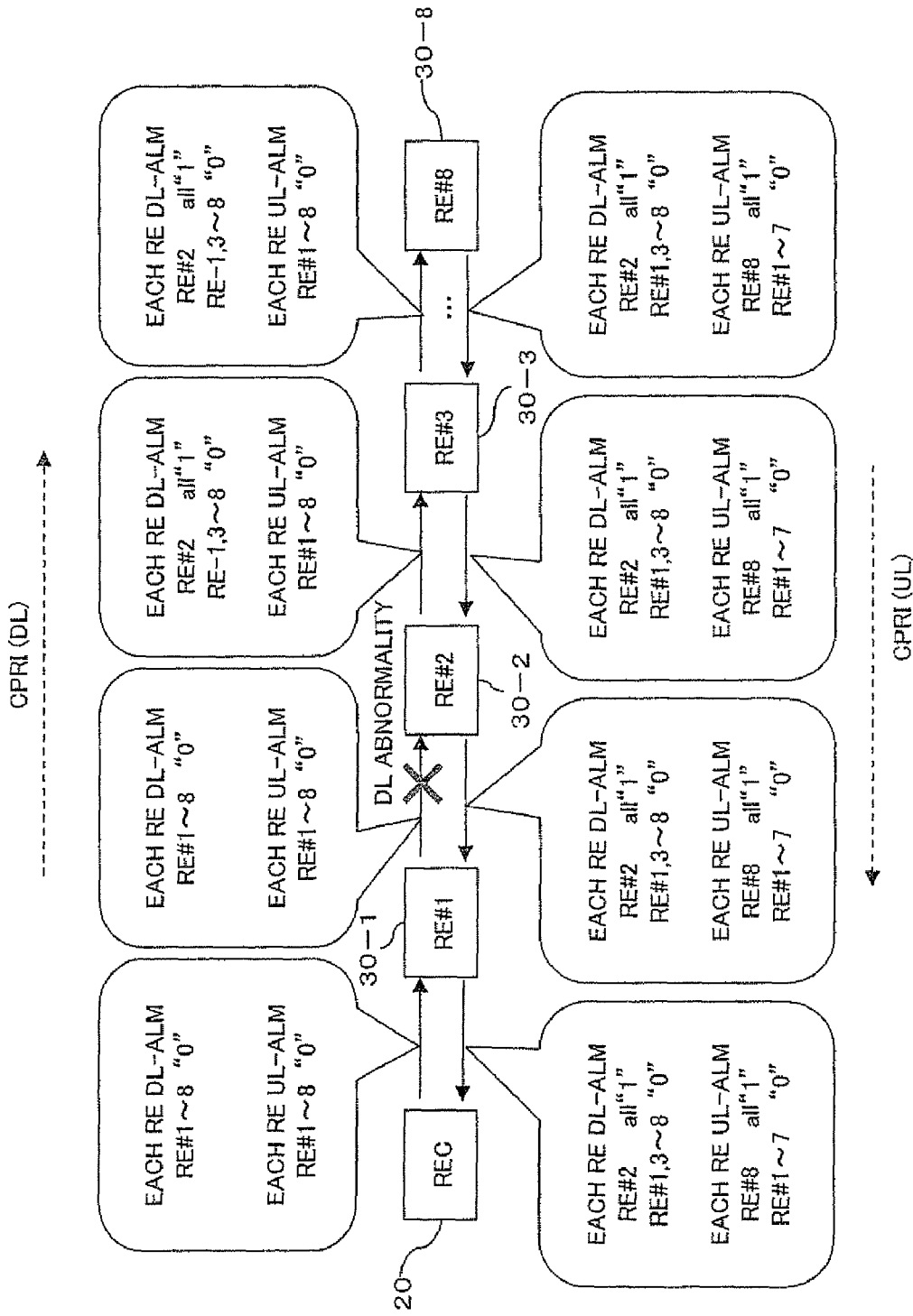
FIG. 10 is a schematic diagram describing an operation (CPRI link abnormality notification) of the radio base station system of the embodiment.
Figure 11:
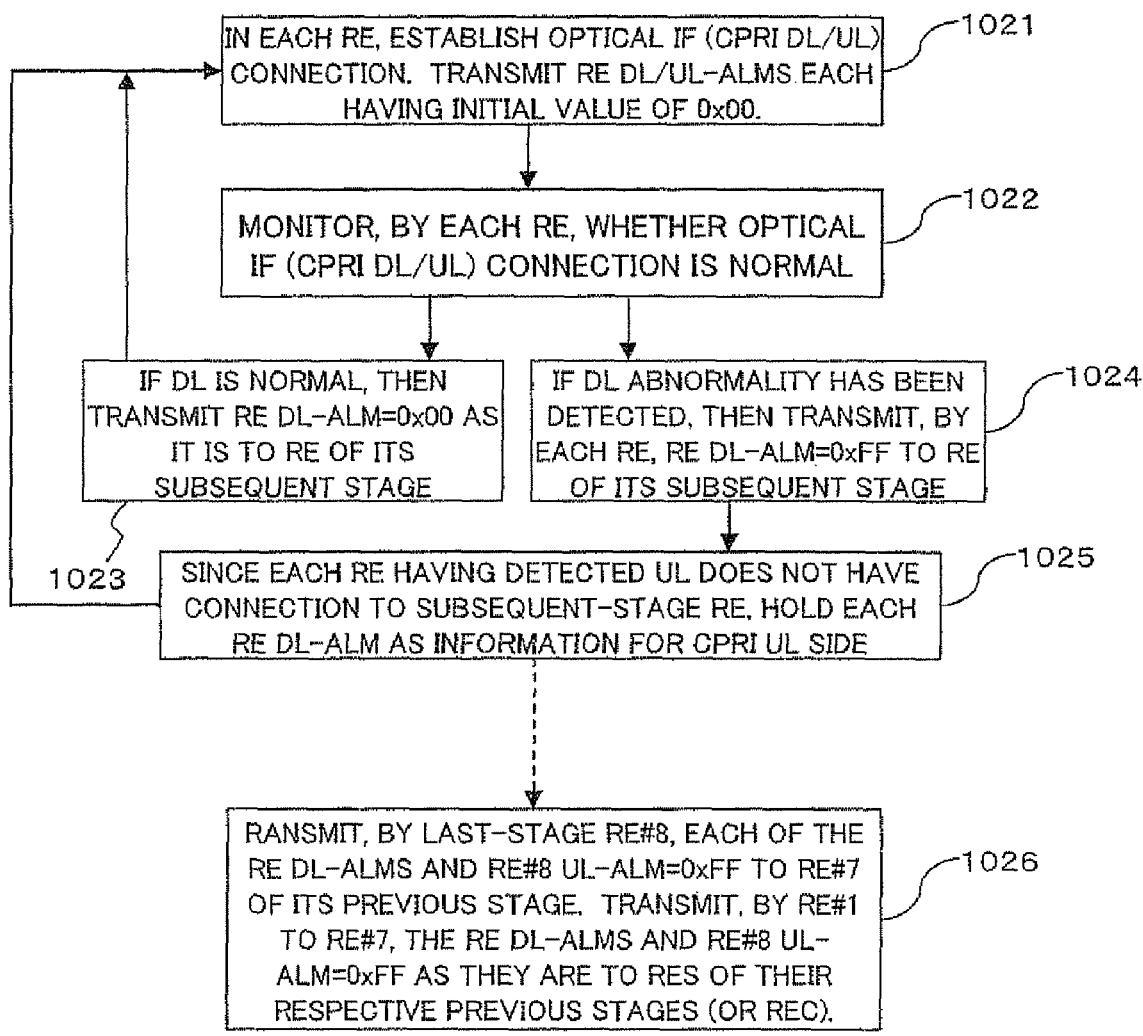
FIG. 11 is a flowchart describing the operation (CPRI link abnormality notification) of the radio base station system of the embodiment.

Then, as exemplified in FIG. 10, the REC 20 (transmit/receive interface 22) transmits control words in which the DL/UL-ALM information (fields) for eight REs are set to a state of non-occurrence of abnormality (e.g., all "0"), to the RE 30-1 over the DL CPRI link (process 1021 in FIG. 11).

Figure 15:
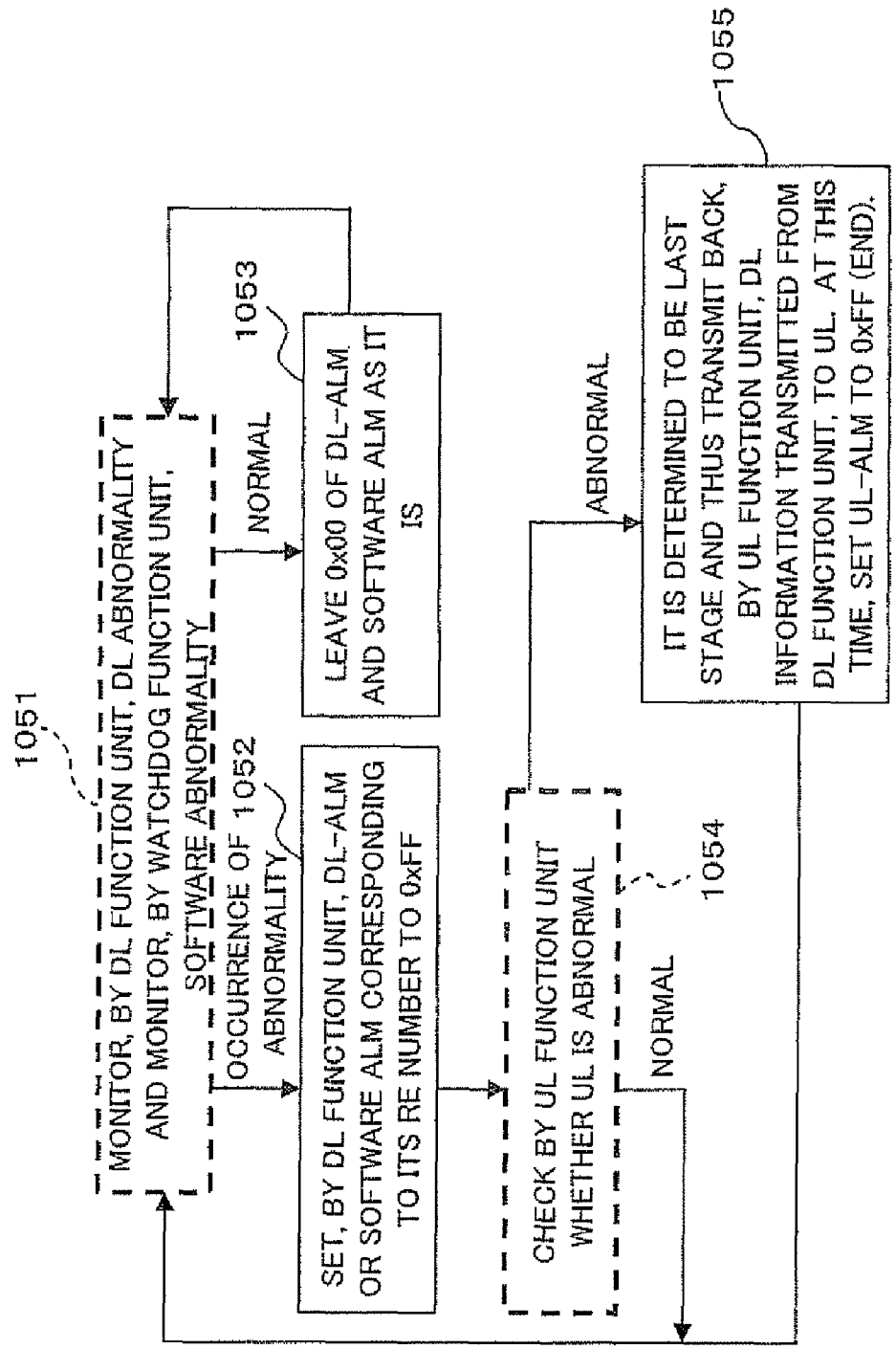
FIG. 15 is a flowchart describing an operation (CPRI link/ RE software abnormality notification) of the RE of the embodiment.
Figure 16:
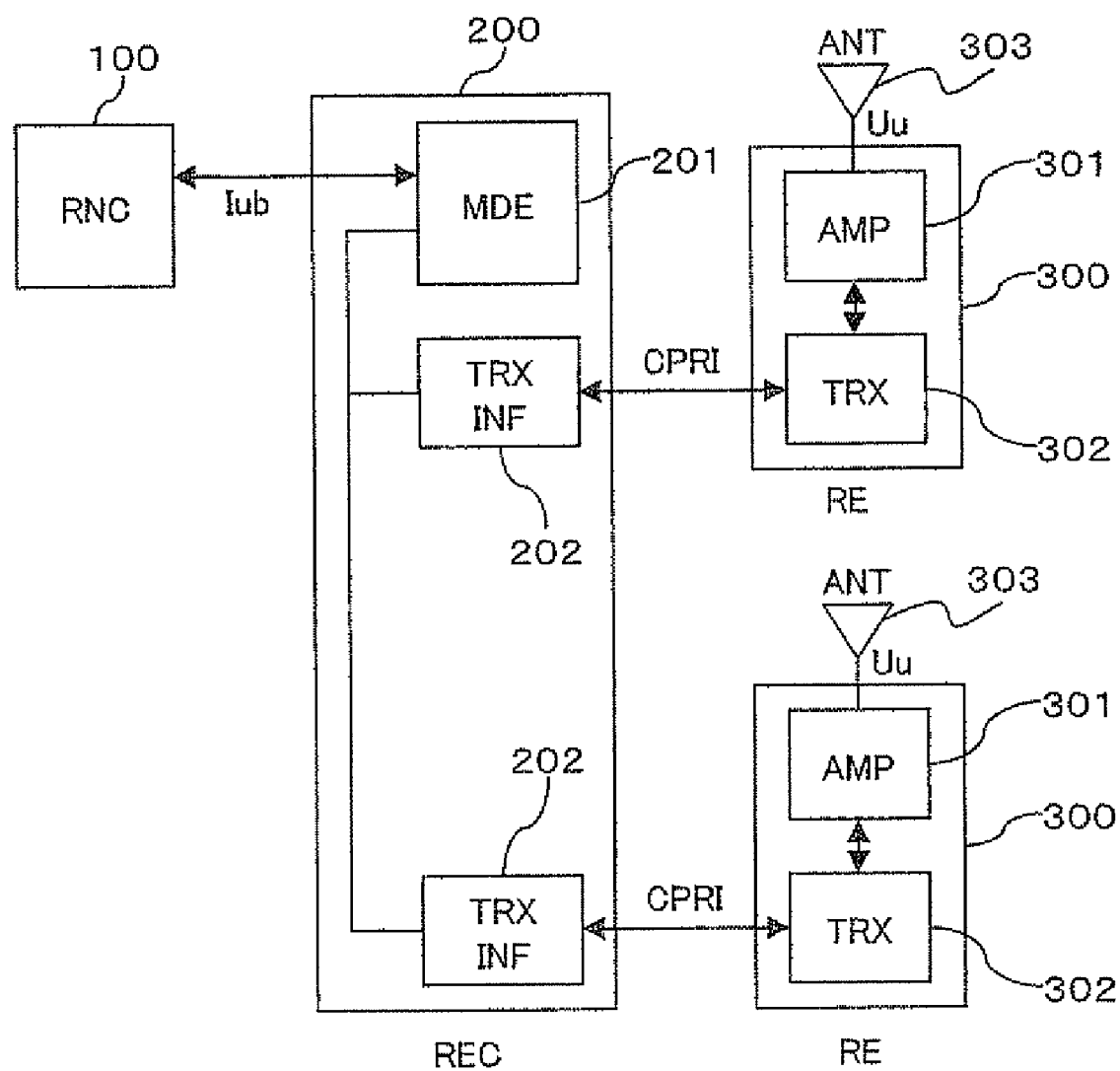
FIG. 16 is a diagram illustrating an example of a radio base station system.

Each RE 30 (DL function unit 3233) monitors normality of the DL CPRI link between the RE 30 and an RE 30 of its previous stage (process 1022 in FIG. 11 and process 1051 in FIG. 15). If normal, then each RE 30 (DL function unit 3233) transmits the control words received over the DL CPRI link to an RE 30 of its subsequent stage without performing any operation on the DL/UL-ALM information in the control words (process 1023 in FIG. 11 and process 1053 in FIG. 15).

On the other hand, if abnormality has occurred in the DL CPRI link between the RE 30 and the RE 30 of its previous stage, then the DL function unit 3233 changes DL/UL-ALM information corresponding to an RE#i identifier of the RE 30 to an abnormality occurrence state (e.g., all "1") and then transmits the control words to the RE 30 of its subsequent stage (process 1024 in FIG. 11 and process 1052 in FIG. 15).

FIG. 10 exemplifies the case in which abnormality has occurred in the DL CPRI link between the RE 30-1 and the RE 30-2. In this case, the RE 30-2 detects the abnormality and thus changes DL-ALM information of RE#2 to all "1" and then transmits the control words to the RE 30-3 of its subsequent stage.

Since the last-stage RE 30-8 (DL function unit 3233) does not have an RE 30 of its subsequent stage, the RE 30-8 (DL function unit 3233) transfers the control words (vendor-specific information) to a UL function unit 3234 and the control words (vendor-specific information) are transmitted back to the UL CPRI link. At this time, since the RE 30-8 does not have an RE 30 of its subsequent stage, the RE 30-8 is in a state of UL CPRI link abnormality. Therefore, the RE 30-8 (UL function unit 3224) changes UL-ALM information corresponding to an RE#8 identifier of the RE 30-8 to all "1" and then transmits the control words to the RE 30-7 of its previous stage (process 1025 in FIG. 11 and from "abnormal" route of process 1054 in FIG. 15 to process 1055). Note that those REs 30 other than the last RE 30-8 thereafter continue to monitor the DL CPRI link by the respective DL function units 3223 if there is no abnormality in the UL CPRI link ("normal" route of process 1054 in FIG. 15).

If there is no abnormality in the UL CPRI link, each of the REs 30-7 to 30-1 (UL function units 3234) transmits the control words (UL-ALM information) received from an RE 30 of its subsequent stage as they are to an RE 30 of its previous stage or the REC 20 without performing any operation on the control words (UL-ALM information) (process 1026 in FIG. 11). If abnormality has occurred in the UL CPRI link, then the UL function unit 3234 changes UL-ALM information corresponding to an RE#i identifier of the RE 30 to all "1" and then transmits the control words to the RE 30 of its previous stage or the REC 20.

The REC 20 (transmit/receive interface 22) can recognize whether there is abnormality in the DL/UL CPRI link, by referring to the respective pieces of DL/UL-ALM information in the control words received from the UL CPRI link. In the case of the example of FIG. 10, since the DL-ALM information of RE#2 is all "1", the REC 20 can determine that abnormality has occurred in the DL CPRI link between the RE 30-1 and RE 30-2. In this case, the REC 20 (e.g., the transmit/receive interface 22) can keep a log of the ALM information or can notify an operator, etc., of the abnormality.

Note that although the UL/ALM information of RE#8 is also all "1", which is because the last-stage RE 30-8 does not have an RE 30 of its subsequent stage, the RE 30-8 is always in a state of UL CPRI link abnormality. Thus, the REC 20 can confirm, together with RE#8 identifier assignment information which is already described, that the RE 30-8 is the last RE.

Each RE 30 can notify the REC 20 of not only CPRI link abnormality but also software abnormality. To do so, in the REC 20 and each RE 30, as exemplified in the above-described table 1, control words (vendor-specific information) from the index Xs=0 of the subchannel number=22 to the index Xs=3 of the subchannel number=23 are defined (as-signed), in one byte (8 bits) unit, as software ALM information fields for respective REs#i (i=1 to 8).

Figure 12:
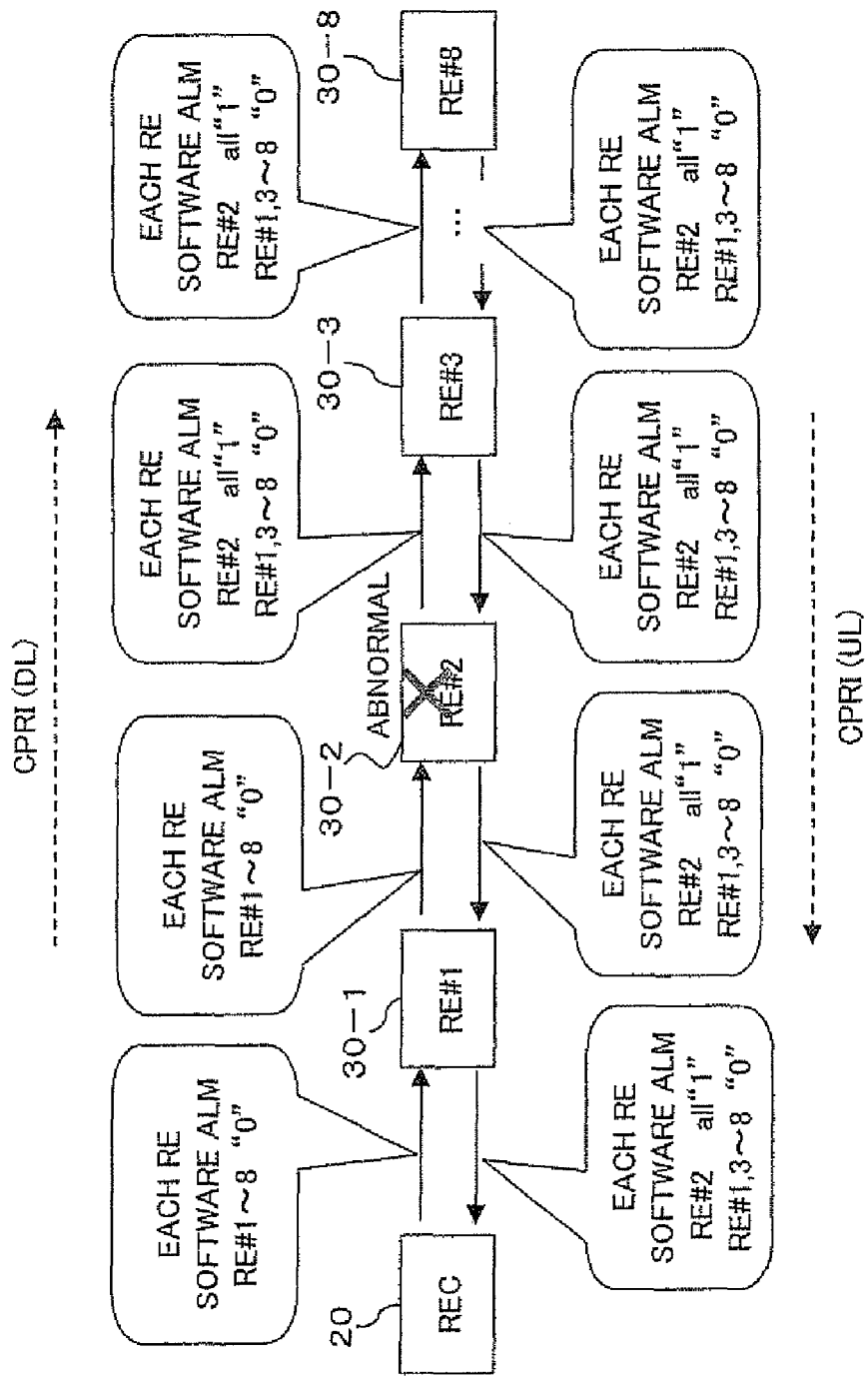
FIG. 12 is a schematic diagram describing an operation (RE software abnormality notification) of the radio base station system of the embodiment.
Figure 13:
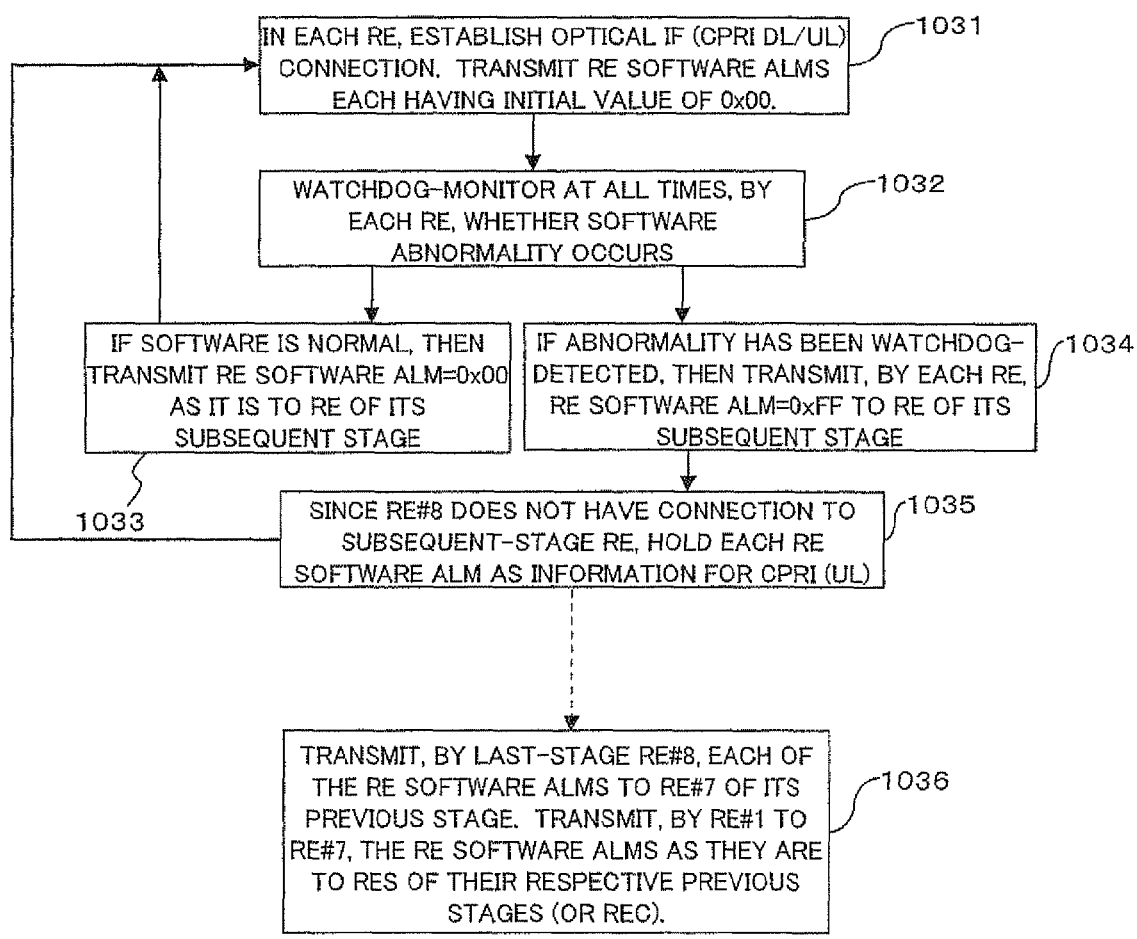
FIG. 13 is a flowchart describing the operation (RE software abnormality notification) of the radio base station system of the embodiment.

Then, as exemplified in FIG. 12, the REC 20 (transmit/receive interface 22) transmits control words in which the RE#i software ALM information (fields) for eight REs are set to a state of non-occurrence of abnormality (e.g., all "0"), to the RE 30-1 over the DL CPRI link (process 1031 in FIG. 13).

Each RE 30 periodically monitors, by its watchdog function unit 3232, whether there is software abnormality (process 1032 in FIG. 13 and process 1051 in FIG. 15). If software abnormality is not detected, then the RE 30 (DL function unit 3233) transmits the control words (RE#i software ALM information) received over the DL CPRI link, as they are to an RE 30 of its subsequent stage without performing any operation on the control words (RE#i software ALM information) (process 1033 in FIG. 13 and process 1053 in FIG. 15).

On the other hand, if software abnormality is detected by the watchdog function unit 3232, then the RE 30 (DL function unit 3233) changes RE#i software ALM information corresponding to an RE#i identifier of the RE 30 to an abnormality occurrence state (e.g., all "1") and then transmits the control words to an RE 30 of its subsequent stage (process 1034 in FIG. 13 and process 1052 in FIG. 15).

FIG. 12 exemplifies the case in which software abnormality has occurred in the RE 30-2. In this case, the RE 30-2 changes RE#2 software ALM information to all "1" and then transmits the control words to the RE 30-3 of its subsequent stage.

Since the last-stage of RE 30-8 (DL function unit 3233) does not have an RE 30 of its subsequent stage, the RE 30-8 transfers the control words (vendor-specific information) to the UL function unit 3234 and the control words (vendor-specific information) are transmitted back to the UL CPRI link (from an "abnormal" route of process 1054 in FIG. 15 to process 1055). Note that those REs 30 other than the last RE 30-8 thereafter continue to monitor by the respective watchdog function units 3221 whether there is software abnormality, if there is no abnormality in the UL CPRI link ("normal" route of process 1054 in FIG. 15).

If there is no software abnormality, each of the REs 30-7 to 30-1 (UL function units 3234) transmits the control words (software ALM information) received from an RE 30 of its subsequent stage, as they are to an RE 30 of its previous stage or the REC 20 (processes 1035 and 1036 in FIG. 13).

The REC 20 (transmit/receive interface 22) can recognize which RE 30 software abnormality has occurred in, by referring to the respective pieces of RE#i software ALM information in the control words received from the UL CPRI link. In the case of the example of FIG. 12, since the RE#2 software ALM information is all "1", the REC 20 can determine that software abnormality has occurred in the RE 30-2.

In this case, the REC 20 (e.g., the transmit/receive interface 22) can keep a log of the ALM information or can notify an operator, etc., of the software abnormality. Also, the REC 20 can forcefully reset software (CPU 324 and FPGA 323) of the RE 30-2 where the software abnormality has occurred.

(1.3.3) Reset Control from the REC 20 to an RE 30

The above-described reset can be performed as follows. Specifically, in the REC 20 and each RE 30, for example, as exemplified in the above-described table 1, control words (vendor-specific information) from the index Xs=0 of the subchannel number=24 to the index Xs=3 of the subchannel number=25 are defined (assigned), in one byte (8 bits) unit, as reset instruction (RST) information fields for respective REs#i (i=1 to 8).

Then, when there is an RE 30 that has recognized occurrence of software abnormality, as described above, the REC 20 (transmit/receive interface 22) transmits, over the DL CPRI link, control words in which RST information (field) corresponding to an RE#i identifier of the RE 30 is set to a state indicating a reset instruction (e.g., all "1"), to the RE 30-1.

Each RE 30 (DL function unit 3233) checks whether RST information corresponding to an RE#i identifier of the RE 30 is set to all "1", by referring to a corresponding RST information field in the control words received from the DL CPRI link.

As a result, if the RST information is not set to all "1", then the DL function unit 3233 transmits the received control words as they are to an RE 30 of its subsequent stage. On the other hand, if the RST information is set to all "1", then the DL function unit 3233 provides a reset instruction to a reset function unit 3231. Accordingly, the reset function unit 3231 performs a software reset (restart) of an FPGA 323 and a CPU 324.

Note that when the RE 30 has completed the reset, a UL function unit 3234 can notify the REC 20 of the completion of the reset through the UL CPRI link. The notification is enabled by, for example, changing the RST information having been set to all "1", to all "0". Accordingly, the REC 20 can check software reset execution states of the individual REs 30.

As described above, according to the above-described embodiment, the REC 20 can be allowed to recognize between which of a plurality of REs 30 that are cascade-connected to the REC 20 abnormality has occurred in the CPRI link and/or which RE 30 software abnormality has occurred in. Therefore, an operator, etc., can take quick measures to restore operation.

Also, when the REC 20 recognizes an RE 30 where software abnormality has occurred, the REC 20 can individually perform a software reset on the RE 30. Hence, a workload imposed on an operator, etc., can be reduced.

(2) Others

Note that although the above-described embodiment describes, as an example, the case in which the connection form between the REC 20 and a plurality of REs 30 is a cascade (chain) connection, the above-described process can also be applied to other connection forms (topology), e.g., a tree connection (topology) and a ring connection (topology).

All examples and conditional language recited herein are intended for pedagogical purposes to aid the reader in understanding the invention(s) and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiment(s) has been described in detail, it should be understood that the various changes, substitutions, and alterations could be made hereto without departing from the spirit and scope of the invention(s).

What is claimed is:

1. A radio base station system in which a plurality of radio apparatuses which are elements of a radio base station are cascade-connected to a control apparatus which is an element of the radio base station, wherein
   the control apparatus comprises:
   a transmitting unit that transmits information to a communication link that passes through each of the radio apparatuses and is then received by the control apparatus, the information being updated according to an identifier identifying each of the radio apparatuses at each time passing through each of the radio apparatuses; and
   an identifying unit that identifies the radio apparatuses in the cascade connection, based on an update status of the information having passed through each of the radio apparatuses.

2. The radio base station system according to claim 1, wherein
   each of the radio apparatuses comprises:
   an identifier obtaining unit that obtains the identifier based on the information received from a portion of the communication link on a side of its previous stage; and
   a transferring unit that makes an update according to the obtained identifier to the information and transferring the updated information to a portion of the communication link on a side of its subsequent stage.

3. The radio base station system according to claim 1, wherein the communication link is a communication link based on a Common Public Radio Interface (CPRI) standard.

4. The radio base station system according to claim 3, wherein, as the information, vendor-specific information in control words defined in the CPRI standard is used.

5. The radio base station system according to claim 4, wherein
   the vendor-specific information has identifier fields defined for the respective radio apparatuses, and
   the obtaining of the identifier is to obtain information in an identifier field indicating a non-obtained state, and the update is to change the information in the identifier field to an obtained state.

6. The radio base station system according to claim 1, wherein the control apparatus further comprises a control unit that performs, under the identification, control of individual operations, administration, and maintenance on each of the radio apparatuses, using the communication link.

7. The radio base station system according to claim 2, wherein each of the radio apparatuses further comprises:
   a link abnormality detecting unit that detects abnormality in the communication link from its previous stage or subsequent stage; and
   a link abnormality notifying unit that notifies, when the abnormality in the communication link is detected by the link abnormality detecting unit, the control apparatus of the detection of the abnormality in the communication link that is associated with the obtained identifier, over an abnormality-undetected communication link.

8. The radio base station system according to claim 7, wherein the communication link is a communication link based on a Common Public Radio Interface (CPRI) standard.

9. The radio base station system according to claim 8, wherein the link abnormality notifying unit performs the notification using vendor-specific information in control words defined in the CPRI standard.

10. The radio base station system according to claim 9, wherein the vendor-specific information has link abnormality notification fields defined for the respective identifiers and for each of the previous stage and the subsequent stage.

11. The radio base station system according to claim 2, wherein each of the radio apparatuses further comprises:
    a software abnormality detecting unit that detects software abnormality in the radio apparatus; and
    a software abnormality notifying unit that notifies, when the software abnormality is detected by the software abnormality detecting unit, the control apparatus of the detection of the software abnormality that is associated with the obtained identifier, over the communication link.

12. The radio base station system according to claim 11, wherein the communication link is a communication link based on a Common Public Radio Interface (CPRI) standard.

13. The radio base station system according to claim 12, wherein the software abnormality notifying unit performs the notification using vendor-specific information in control words defined in the CPRI standard.

14. The radio base station system according to claim 10, wherein the vendor-specific information has software abnormality notification fields defined for the respective identifiers.

15. The radio base station system according to claim 11, wherein the control apparatus further comprises a software reset control unit that performs, when receiving the notification of the detection of the software abnormality, a software reset of a radio apparatus identified by the identifier, using the communication link.

16. The radio base station system according to claim 15, wherein the communication link is a communication link based on a Common Public Radio Interface (CPRI) standard.

17. The radio base station system according to claim 16, wherein the software reset control unit provides to the radio apparatus an instruction to perform the software reset, using vendor-specific information in control words defined in the CPRI standard.

18. The radio base station system according to claim 17, wherein the vendor-specific information has software reset information fields defined for the respective identifiers.

19. A control apparatus in a radio base station system in which a plurality of radio apparatuses which are elements of a radio base station are cascade-connected to the control apparatus which is an element of the radio base station, the control apparatus comprising:

a transmitting unit that transmits information to a communication link that passes through each of the radio apparatuses and is then received by the control apparatus, the information being updated according to an identifier identifying each of the radio apparatuses at each time passing through each of the radio apparatuses; and an identifying unit that identifies the radio apparatuses in the cascade connection, based on an update status of the information having passed through each of the radio apparatuses.

20. A radio apparatus in a radio base station system in which a plurality of the radio apparatuses which are elements of a radio base station are cascade-connected to a control apparatus which is an element of the radio base station, the radio apparatus comprising:

an identifier obtaining unit that receives information that is transmitted by the control apparatus to a communication link passing through each of the radio apparatuses and then being received by the control apparatus, and that is updated according to an identifier identifying each of the radio apparatuses at each time passing through the radio apparatuses, from a portion of the communication link on a side of its previous stage and obtaining an identifier based on the information; and a transferring unit that makes an update according to the obtained identifier to the information and transfers the updated information to a portion of the communication link on a side of its subsequent stage.

* * * * *